(12) United States Patent  (10) Patent No.: US 9,076,106 B2
Motukuri et al.  (45) Date of Patent: Jul. 7, 2015

(54) SYSTEMS AND METHODS FOR MANAGEMENT OF RISK IN INDUSTRIAL PLANTS

(71) Applicant: General Electric Company, Schenectady, NY (US)

(72) Inventors: Sai Kumar Motukuri, Secunderabad (IN); Frederick William Block, Campobello, SC (US); Fred Henry Boettner, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 286 days.

(21) Appl. No.: 13/691,336

(22) Filed: Nov. 30, 2012

(65) Prior Publication Data

US 2014/0156584 A1  Jun. 5, 2014

(51) Int. Cl.
    G06F 9/44   (2006.01)
    G06N 7/02   (2006.01)
    G06N 5/04   (2006.01)
    G06Q 10/06  (2012.01)

(52) U.S. Cl.
    CPC ............... *G06N 5/048* (2013.01); *G06Q 10/06* (2013.01)

(58) Field of Classification Search
    None
    See application file for complete search history.

(56) References Cited

U.S. PATENT DOCUMENTS

| 7,019,641 | B1 | 3/2006 | Lakshmanan et al. |
| 2004/0140892 | A1* | 7/2004 | Hanood ........................ 340/511 |
| 2004/0153671 | A1 | 8/2004 | Schuyler et al. |
| 2008/0211668 | A1 | 9/2008 | Dixon et al. |
| 2011/0313617 | A1* | 12/2011 | Omote et al. ................... 701/36 |
| 2012/0290104 | A1 | 11/2012 | Holt et al. |
| 2012/0317058 | A1* | 12/2012 | Abhulimen ...................... 706/2 |
| 2013/0038459 | A1* | 2/2013 | Abe ........................... 340/686.1 |
| 2013/0066820 | A1* | 3/2013 | Apte et al. ....................... 706/46 |
| 2014/0129187 | A1* | 5/2014 | Mazzaro et al. ................... 703/2 |

OTHER PUBLICATIONS

Matthies, "Structural Damage and Risk Assessment and Uncertainty Quantification", in A. Ibrahimbegovic and M. Zlatar (eds.), Damage Assessment and Reconstruction After War or Natural Disaster, 2009, pp. 95-108.*
Atlas et al. "Designing Against Terror, Violence and Crime", ASSE, 2003, pp. 23.*
U.S. Appl. No. 13/431,914, Mar. 27, 2012, Mazzaro, et al.
U.S. Appl. No. 13/670,420, Apr. 19, 2012, Mazzaro, et al.
U.S. Appl. No. 13/670,435, Apr. 19, 2012, Block, et al.

* cited by examiner

*Primary Examiner* — Li-Wu Chang
(74) *Attorney, Agent, or Firm* — Fletcher Yoder, P.C.

(57) ABSTRACT

A system includes a risk assessment system. The risk assessment system includes a risk calculation system configured to calculate a risk based on one or more static inputs and one or more dynamic inputs. The one or more dynamic inputs includes a location of a human resource, a mobile resource, or a combination thereof. The risk assessment system further includes a decision support system (DSS) configured to use the risk to derive one or more decisions based on the risk, the one or more static inputs, and the one or more dynamic inputs. The one or more decisions are configured to aid in operating an industrial facility.

21 Claims, 3 Drawing Sheets

SYSTEMS AND METHODS FOR MANAGEMENT OF RISK IN INDUSTRIAL PLANTS

BACKGROUND OF THE INVENTION

The subject matter disclosed herein relates generally to risk calculation and mitigation, and more particularly, to systems and methods for calculating and mitigating risk within an industrial facility.

Industrial facilities, such as a power generation plants, may include various interrelated equipment and processes. For example, power generation plants may include turbine systems and processes for operating and maintaining the turbine systems. During operation of the industrial facility, the equipment and processes may generate static and dynamic data that may respectively detail designs and conditions throughout the facility. The static and dynamic data may also be used to generate risk assessments of the industrial facility. It would be beneficial to improve risk assessments of the industrial facility.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a one embodiment, a system includes a risk assessment system. The risk assessment system includes a risk calculation system configured to calculate a risk based on one or more static inputs and one or more dynamic inputs. The one or more dynamic inputs include a location of a human resource, a mobile resource, or a combination thereof. The risk assessment system further includes a decision support system (DSS) configured to use the risk to derive one or more decisions based on the risk, the one or more static inputs, and the one or more dynamic inputs. The one or more decisions are configured to aid in operating an industrial facility.

In a second embodiment, a method includes receiving one or more static inputs and one or more dynamic inputs. The one or more dynamic inputs include a location of a human resource, a mobile resource, or a combination thereof. The method further includes calculating a risk based on the one or more static inputs and one or more dynamic inputs. The one or more static inputs and the one or more dynamic inputs are based on an industrial facility. The method further includes deriving a decision based on the calculation of the risk. The decision includes a determined level of the risk and is configured to aid in operations of the industrial facility.

In a third embodiment, a control system includes a risk assessment system. The risk assessment system includes a risk calculation system configured to calculate a risk based on one or more static inputs and one or more dynamic inputs received via a plurality of sensors. The one or more dynamic inputs include a location of a human resource, a mobile resource, or a combination thereof, inside of an industrial facility. The risk assessment system further includes a decision support system (DSS) configured to use the risk to provide a decision based on the risk. The control system also includes a controller configured to use the decision to execute a control action configured to control at least one component of the industrial facility.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to an intelligent risk calculation, management, and mitigation system, which may be used to calculate a risk based on static and dynamic inputs, and to determine the level of risk and one or more control actions to mitigate the risk. Specifically, the dynamic inputs may include dynamic location inputs, such as a location of human resources input and a location of mobile resources input that may be used to derive, manage, and mitigate risk, such as risks that may be associated with humans and movable equipment being present in certain locations, spaces, or areas of the industrial facility. It should be appreciated that the presently disclosed embodiments may apply to a variety of industrial facilities, including but not limited to power plants, chemical plants, manufacturing plants, oil refineries, repair shops, testbed rooms, labs, and the like. As used herein, "risk" may refer to any known, anticipatory, historical, and/or predictive possible hazard that may occur due to certain actions, inactions, unforeseen events, or a combination thereof. Further, "risk" may refer to a possibility of loss, injury, damage, and so forth, that may possibly occur involving certain resources (e.g., personnel, equipment, assets). Still further, as used herein, "risk" may refer to a quantifiable measure, a probability, a qualitative assessment, a statistical analysis, an anticipatory evaluation, or a combination thereof.

Figure 1:
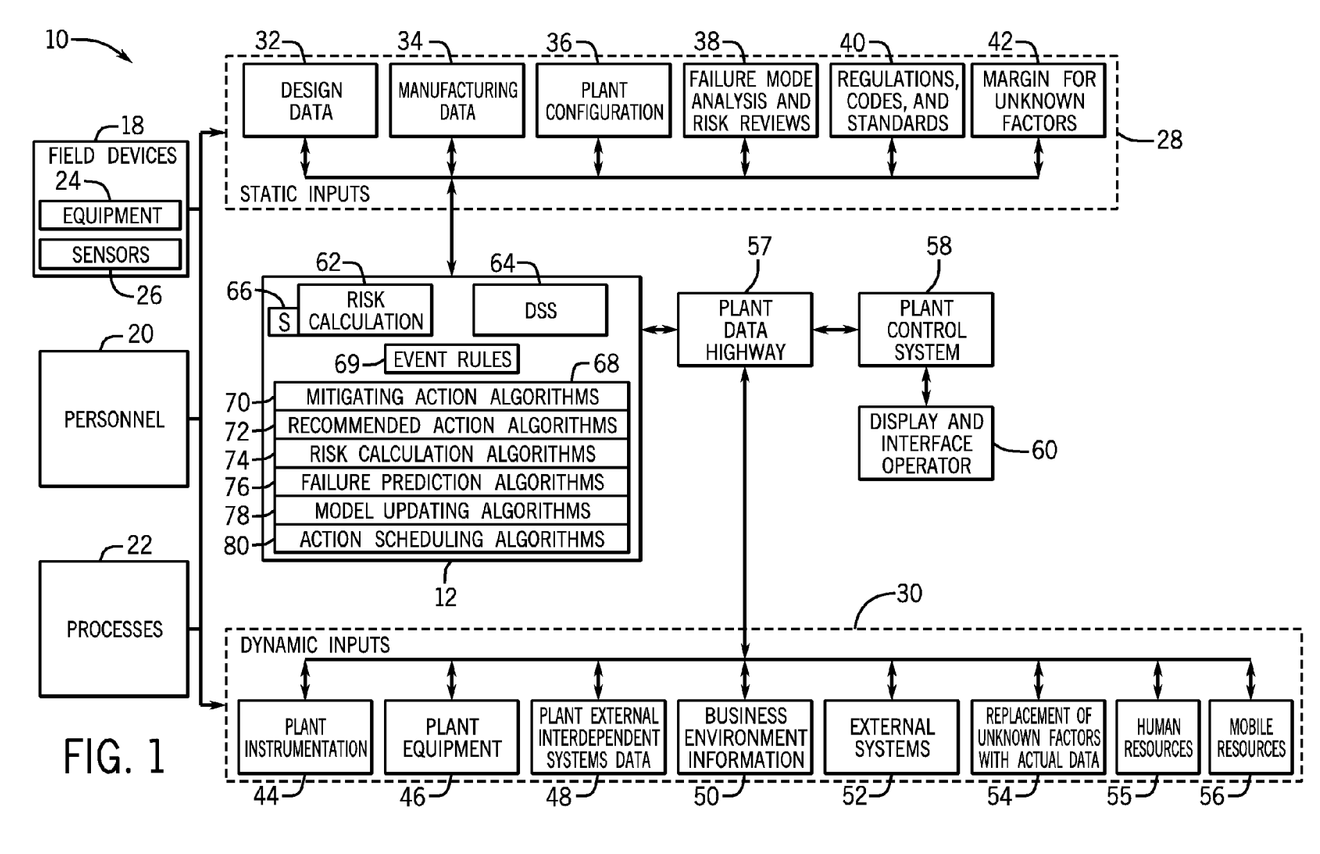
FIG. 1 is a block diagram illustrating an embodiment of an industrial facility in accordance with present embodiments.

With the foregoing mind, it may be useful to describe an embodiment of an industrial facility 10, as depicted in FIG. 1. As illustrated, the industrial facility 10 may include an intelligent risk assessment system 12 communicatively coupled to various field devices 18, plant personnel 20, and/or plant processes 22. The field devices 18 may include various plant equipment 24 and sensors 26. For example, the plant equipment 24 may include turbine systems (e.g., steam turbines, gas turbines, hydroelectric turbines, wind turbines), generators, expanders, pumps, compressors, valves, electrical systems, chemical reactors, gasifiers, gas treatment systems (e.g., acid gas removal systems) air separation units (ASUs), boilers, furnaces, water treatment systems, heat recovery steam generator (HRSG) systems, vats, conveyor belt systems, conduits, milling machines, forging equipment, casting equipment and the like, useful in operating the facility 10. The sensors 26 may include, for example, pressure sensors, temperature sensors, flow sensors, status and position indicators (e.g. limit switches, Hall effect switches, acoustic proximity switches, etc.), infrared sensors, radars, antennas (e.g., linear or phased-array), thermal radiation detectors, motion detectors, biosensors (e.g., biometric sensors), and a number of other sensors (e.g., wired and/or wireless) that may be used to detect human and/or mobile resource (e.g., mobile equipment, transportation equipment [trucks, automobiles, carts]) presence in one or more locations of the facility 10. In certain embodiments, the sensors 26 may pervade the facility 10, such that the presence of a human or other mobile resource may be detected and accounted for in all areas of the facility 10.

In certain embodiments, the field devices 18, personnel 20, and/or processes 22 may produce data generally categorized as static inputs 28 or dynamic inputs 30. The static inputs 28 may include data created during construction of the facility 10 and may be modified infrequently, while the dynamic inputs 30 may include data produced during plant operations. For example, the static inputs 28 may include design data 32, manufacturing data 34, plant configuration data 36, failure mode analysis and risk review data 38, federal and state regulations, codes and standards data 40, and margin for unknown factors data 42. The design data 32 may include data related to the design of the facility 10, such as process flowcharts detailing plant processes, data detailing equipment and instrumentation capabilities, and so forth. The manufacturing data 34 may include data related to the fabrication of the facility 10, such as, for example, any deviations from the plant design or bill of materials (BOMs) for the plant and equipment. The plant configuration data 36 may include data related to the configuration and layout of the facility 10. Failure mode analysis and risk reviews data 38 may include data useful in deriving certain risks associated with the operations and/or equipment 24 of the facility 10. For example, the failure mode analysis and risk reviews data 38 may include physics-based models, such as such as low cycle fatigue (LCF) life prediction models, computational fluid dynamics (CFD) models, finite element analysis (FEA) models, solid models (e.g., parametric and non-parametric modeling), and/or 3-dimension to 2-dimension FEA mapping models that may be used to predict the risk of equipment operation, undesired stoppages, or the need for equipment maintenance. The failure mode analysis and risk reviews data 38 may also include statistical models, such as regression analysis models, data mining models (e.g., clustering models, classification models, association models), and the like. For example, clustering techniques may discover groups or structures in the data that are in some way "similar." As will be discussed in further detail below, the static inputs 28, along with the dynamic inputs 30, may be used calculate and manage risk that may be associated with one or more of the static inputs 28 and/or the dynamic inputs 30 in view of location information (e.g., human and equipment location).

The regulations, codes, and standards data 40 may include data useful in maintaining compliance with federal and state law as well as upholding industrial standards. For example, the data 40 may include federal and state regulations, codes, and permitting requirements related to plant emissions, plant safety, types of fuel used, maximum achievable control technologies (MACT), plant operations, and so forth. The margin for unknown factors data 42 may include, for example, data related to the addition of safety margins or to accommodate unknown factors such as certain risks (e.g., equipment failure risks) that may adversely impact facility 10 operations.

The dynamic inputs 30 may include plant instrumentation data 44, plant equipment data 46, plant external interdependent systems data 48, business environment data 50, external systems data 52, and/or replacement of unknown factors with actual data 54. The plant instrumentation data 44 may include measurements and derivations based on the instrumentation 26. For example, the data may include temperature measurements, pressure measurements, flow measurements, clearance measurements (e.g., measuring distances between a rotating component and a stationary component), vibration measurements, position measurements, chemical measurements, power production measurements, exhaust emissions measurements, stress or strain measurements, leakage measurements, speed measurements, and so forth. The plant equipment data 46 may include data related to individual equipment 24. For example, the data 46 may include operating conditions of the equipment 24 (e.g., speed, temperature, pressure, vibration, flow, fuel consumption, power production, clearance), maintenance history (e.g., maintenance logs), performance history (e.g., power production logs), and the like.

The plant external interdependent systems data 48 may include data related to external systems, such as other plants 10 (e.g., power plants, chemical plants, refineries, manufacturing plants), that may be interrelated or interdependent with the depicted industrial facility 10. Such data 48 may include power grid information, fuel supply information (e.g., gas supply, feedstock supply, and oil supply), water supply information, raw material supply information, and so forth. The business environment data 50 may include data associated with economic and business conditions that may impact the facility 10. For example, the data 50 may include market data for the demand and supply of electrical power, manufactured goods, fuel, raw materials (e.g., metals, chemicals), and/or processed materials (e.g., processed chemicals, refined oil). Further, the data 50 may include data related to futures market, e.g., sales of future power output, future commodities, future raw material, and the like. Additionally, the data 50 may include supply and demand data in regulatory markets, such as cap and trade markets (i.e., emissions markets). Further, the data 50 may include business data related to tax credits for emission controls, tax credits for the use of certain technologies (e.g., carbon capture technologies, carbon sequestration technologies), regulatory costs related to the emissions of certain chemicals (e.g., sulfur emissions, $CO_2$ emissions), and so forth. The external systems data 52 may include data from external systems such as weather prediction systems (e.g., Global Forecast System [GFS], Doppler radars, etc.), maintenance systems (e.g., electronic maintenance logs), and so forth.

In certain embodiments, the dynamic inputs 30 may also include a human resources input 55 and a mobile resources input 56. The human resources input 55 may include any data related to detecting the presence of a human in one or more locations of the industrial facility 10. For example, the human resources input 55 may be a collection of data received via the sensors 26 detailing the location of humans within the facility 10. The human resources input 55 may include data related to humans detected in one or more confined spaces, possibly hazardous areas, or restricted areas of the facility 10, or any area of the facility 10. For example, as will be further appreciated, while supporting operations in one or more of the possibly hazardous or restricted areas of the facility 10, facility 10 personnel 20 (e.g., engineers, field technicians, supervisors, contractors, etc.) may be susceptible to possible hazards including electromagnetic radiation (e.g., X-rays, gamma rays, etc.) exposure, nuclear radiation, possibly hazardous gas (e.g., CO emissions), dust, chemical, oxygen depleted spaces, fire, smoke, thermal energy and radiation, rotational energy and vibration, exposure to excessive temperatures (e.g., boiling or freezing temperatures), fatigue, alertness level, noise levels, exposure to low and high pressure environments, and so forth. Additionally, the presence of humans and mobile resources in certain areas of the facility 10 may result in changes (e.g., increases or decreases) in operations risk of the facility, and/or in risks to the human and/or the mobile resource. As will be discuss in further detail below, the human resources input 55 may be used to calculate, manage, and mitigate risk (e.g., human risk, facility operations risk, equipment operations risk) that may be associated with humans being detected in certain locations, spaces or areas of the facility 10.

Similarly, the mobile resources input 56 may include any data related to detecting the presence of mobile resources in one or more areas of the industrial facility 10. The mobile resources input 56 may be a collection of data received via the sensors 26 detailing the location, location information transmitted by the mobile resources (e.g., via location transmitters), and/or the movement of mobile resources within the facility 10. For example, the mobile resources input 56 may include any mobile resource type (e.g., tankers, cranes, towing vehicles, and so forth) that may be moved in and out of the facility 10 or fixed resources (e.g., equipment 24) the may be replaced or rearranged during, for example, a maintenance turnaround of the facility 10. Particularly, mobile resources that may travel in and out of the facility 10 or within or nearby certain spaces or areas of the facility 10 may, for example, create increased risk of undesired incidents. Such increase in risk may be derived by the techniques described herein, thus improving the safety of the personnel 20, processes 22, and the equipment 24 of the facility 10. Accordingly, much like the human resources input 55, the mobile resources input 56 may be used to calculate, manage, and mitigate such risk.

In certain embodiments, the dynamic inputs 30 may be transferred to the intelligent risk assessment system 12 by using, for example, a plant data highway 57. The plant data highway 57 may include networking equipment suitable for transmitting the dynamic inputs 30 to the intelligent system 12. The plant data highway 57 may also be used to communicatively connect the intelligent risk assessment system 12 to a plant control system 58. The plant control system 58 may include a distributed control system (DCS), a manufacturing execution system (MES), a supervisor control and data acquisition (SCADA) system, and/or a human machine interface (HMI) system. Accordingly, the plant control system 58 may provide inputs to the intelligent system 12, such as current control settings and alarms. In certain embodiments, the intelligent risk assessment system 12 may transmit instructions to the plant control system 58 suitable for implementing control actions to mitigate risk within the facility 10. A display and interface system 60 may also be included to allow an operator to interact with the plant control system 58, the intelligent system 12, and various other components of the facility 10.

As previously discussed, in certain embodiments, the facility may include the intelligent risk assessment system 12. More specifically, the intelligent risk assessment system 12 may include a risk calculation system 62 and a decision support system (DSS) 64. The risk calculation system 62, the DSS 64, and the intelligent risk assessment system 12 may each include code or instructions stored in a non-transitory machine-readable medium (e.g., a memory and/or storage of a computing device) and executed, for example, by one or more processors of the computing device (e.g., controller, workstation, laptop, mobile device, tablet). The risk calculation system 62 may compute and calculate risk based on the static inputs 28 and dynamic inputs 30. More particularly, the risk calculation system 62 may be any system (e.g., hardware or software system) configured to calculate, identify, assess, rank, and determine a quantitative or qualitative value or level of risk based on known, anticipatory, historical, and/or premonitory data related to location(s) of, for example, the personnel 20, processes 22, and the equipment 24 of the facility 10. In certain embodiments, the risk calculation system 62 may include an accident scenario review (ASR) model or process to derive, for example, the probability of certain events, such as undesired work stoppage events, accidents, undesired conditions (e.g., trip events, low power events, high power events, low speed events, high speed events, low pressure events, high pressure events). However, instead of computing only a probabilistic model, the risk calculation system 62 may use actual data (e.g., data collected via sensors 26), including dynamic and historic location data, based on the static inputs 28 and the dynamic inputs 30 to calculate and rank the risk (e.g., assign a level or degree of risk). For example, in evaluating the risk associated with a turbine system included in the facility 10 during an overspeed test of the turbine system, if a human is stationed near or in a neighboring area of the turbine system, the risk calculation system 62 may compute one or more risk values based on the human's location (e.g., near the turbine system) These risk values may include the risk to the human, the risk to the equipment (e.g., turbine system), and the risk to operations (e.g., risk of deviations from desired operations).

In certain embodiments, the risk calculation system 62 may include statistical models (e.g., linear regression, non-linear regression, Monte Carlo simulation, Markov models), physics-based models (e.g., LCF models, CFD models, FEA models, solid models, 3-dimension to 2-dimension FEA mapping models that may be used to predict the risk of equipment operation, undesired stoppages, or the need for equipment maintenance), heuristic models (e.g., neural networks, fuzzy logic models, expert system models, state vector machine models useful in risk and safety prediction), and so on, may be used to derive the risk based on the static and dynamic inputs 28 and 30.

In one embodiment, the risk calculation system 62 may provide reports for insurance and facility 10 evaluation purposes, which may, for example, contribute to safer practices and awareness of possibly hazardous situations that may occur within the facility 10. That is, historical location data may be analyzed and used to derive risks, including risks associated with locations and movements of people and equipment, over time, giving a more detailed view of risks in the overall facility 10 (e.g., human risk, equipment risk, operations risk) than compared to risk calculations that do not include location information. Accordingly, better actuarial data may be provided, which may result in insurance improvements (e.g., cost, contractual improvements, and the like).

In certain embodiments, the risk calculation system 62 may also calculate risk by including multiple layers of risk and/or parallel risk that may exist concurrently. For example, a site tour of the facility 10 may include large numbers of non-technical personnel (e.g., trainees, business professionals, project managers, etc.). The caravan of non-technical personnel may increase risk with not only their presence, but may also contribute, for example, to the generating of dust within the facility 10. The dust may increase the risk associated with a field-technician performing hot work (e.g., welding, soldering, plasma cutting, sawing, etc.), as the heat generated by the hot work and the dust may contribute to a possible hazard. In one embodiment, these interlinked effects may be taken into consideration to derive a risk dynamically as the group tours the facility. In another embodiment, a simulation engine 66 may be used to simulate the effect of the group tour as people and equipment move from location to location, for example, by inputting simulated people and equipment locations to the risk calculation system 62. The risk calculation system 62 may also calculate risk associated with locations of weather disruptions (and/or natural disasters such as earthquakes, tsunamis, hurricanes, tornadoes, and the like), which may be included as a singular risk factor or as an additional layer of risk in combination with the aforementioned. As will be further appreciated, calculated risk may be ranked and assigned a certain risk level that may correspond to a number of control actions used to manage and mitigate such risk.

As noted above, the intelligent system 12 may also include the DSS 64. The DSS 64 may be a computer-based (e.g., software and hardware) information system used to support decision-making actions (e.g., risk level determinations and control actions) within the facility 10. For example, the DSS 64 may be a communication-driven DSS, a data-driven DSS, a document-driven DSS, a knowledge-driven DSS, a model-driven DSS, or an intelligent decision support system (IDSS). Specifically, the DSS 64 may make or aid in making decisions based on the known, anticipatory, historical, and/or predictive risk calculated by the risk calculation system 62. Accordingly, the DSS 64 may include both artificial intelligence (AI) and knowledge-based subsystems. The DSS 64 may also act or aid in acting to certain levels of risk with respective control actions. For example, the DSS 64 may be configured to limit or restrict access to certain locations (e.g., confined spaces, restricted areas, and possibly hazardous areas) of the facility 10 based on one or more determinations of the level of dynamic risk that may be present. Likewise, the DSS 64 may provide control actions suitable for, example, for minimizing risks (e.g., human risk, equipment risk, plant operations risk). For example, the DSS 64 may actuate valves, pumps, other actuators, communicate with other controllers, and so on, to limit undesired risk to humans, equipment, and/or plant operations.

Decisions and/or control actions implemented by the DSS 64 may include limiting access to certain areas of the facility to only authorized personnel 20 (e.g., engineers and field technicians), or limiting access based on the number of (e.g., 1 or 2 per time period) of personnel 20. In another embodiment, access may be restricted based on the skill sets and physiological characteristics (e.g., physical endurance, speed, agility, physical strength, fatigue level, etc.) of the personnel 20. The DSS 64 may also provide instructions to the plant control system 58 to perform control actions such as triggering alarms, shutting down of equipment 24, tripping (e.g., temporarily deactivating) equipment 24, inhibiting of equipment 24, an emergency powering down and access restriction of the equipment 24, and so forth. As previously discussed, a control action may be selected by the DSS 64 commensurate with the determined level of the calculated risk.

The intelligent risk assessment system 12 may further include multiple event rules 69 and algorithms 68 that may be used by the risk calculation system 62 and the DSS 64 to derive a more optimal utilization of the facility 10 resources, including field devices 18 and personnel 20. For example, the event rules 69 may be used to detect one or more facility 10 events (e.g. location based events), and the events may then be used to select one or more of the algorithms 68. The events may include entering or leaving certain areas, certain operational events (e.g., start of an overspeed test or other equipment tests), certain maintenance events (e.g., start of schedule or unscheduled maintenance), and so on. The algorithms 68 may include mitigation action algorithms 70 suitable for deriving actions useful in mitigating, for example, risks of equipment 24 and/or field devices 18 malfunctioning, as well as mitigating the impact of unreliable equipment 24. The algorithms 68 may also include recommended action algorithms 72 suitable for recommending actions that may be useful in responding to various facility 10 conditions. Risk calculation algorithms 74 may also be used, which may allow the calculation of various risks, by using, for example, ASR models as discussed above. Failure prediction algorithms 76 may be used to predict a probability or a risk of failure of equipment 24 and/or field devices 18. For example, CF life prediction models, CFD models, FEA models, solid models, and/or 3-dimension to 2-dimension FEA mapping models, regression analysis models, and data mining models may be used to predict the risk of failure. Model updating algorithms 78 may update the aforementioned CF life prediction models, CFD models, FEA models, solid models, and/or 3-dimension to 2-dimension FEA mapping models, regression analysis models, and data mining models with the latest data and/or calculations. Action scheduling algorithms 80 may derive a schedule for performing actions, such as maintenance or operational actions, suitable for managing and mitigating risk within the facility 10.

Figure 2:
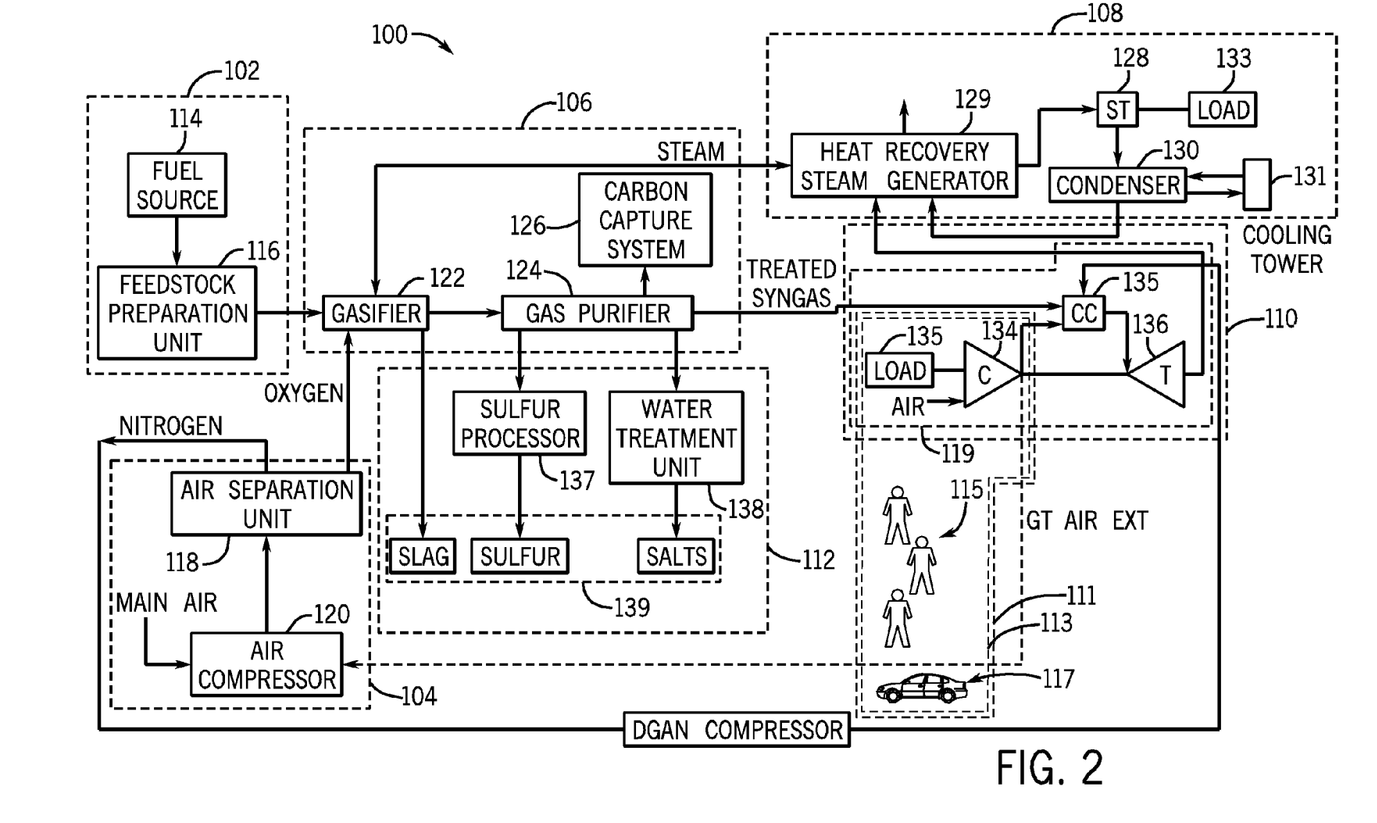
FIG. 2 is a schematic illustrating an example of a risk diagram of the system of FIG. 1 including possibly hazardous locations in accordance with present embodiments.

In certain embodiments, as depicted in FIG. 2, the intelligent risk assessment system 12 may include a graphical representation or screen 100 representative of the calculated and determined risk data (e.g., calculated and determined by the risk calculation system 62 and the DSS 64). As depicted, the intelligent risk assessment system 12 may derive and generate a graphical display 100, in which locations or shapes 102, 104, 106, 108, 110, and 112 may illustrate areas and levels of risk. The locations 102, 104, 106, 108, 110, and 112 may be displayed as levels of grey, or color-coded to display variable colors (e.g., blue-low, green-mild, yellow-high, orange-very high, red-extremely high, and so forth), as an indication of the level of risk based on historical, current, or predictive risk data associated with each or all of the locations 102, 104, 106, 108, 110, and 112. While the locations 102, 104, 106, 108, 110, and 112 may be fixed locations, other locations, such as locations or shapes 111 and 113, may dynamically expand, shrink, and/or change shapes according to the risk. For example, as the tour group moves through the facility, the shapes 111 and 113 may appear and show the risk associated with current location of the tour group. Additionally, figures of people 115 and equipment 117 may be shown on the screen 100, or selecting the shapes 111 and 113 on the screen 100 may display a respective live video.

For example, as illustrated in FIG. 2, the locations 102 and 104 may respectively include a fuel source 114 and fuel preparation unit 116, and an air separation unit 118 and air compressor 120. The fuel source 114 and fuel preparation unit 116 may contain a number of controlled fuels or gases (e.g., coal, petroleum coke, oil, biomass, etc.), while the separation unit 118 may separate oxygen from the air supplied to it from the air compressor 120, and transfer the separated oxygen. Accordingly, the locations 102 and 104 may have relatively mild risk levels and display colors such as blue or green, for example, to indicate the determined risk level. The location 106 may include a gasifier 122, a gas purifier 124, and a carbon capture system 126. The gasifier 122 may convert the feedstock into a syngas, (e.g., a combination of carbon monoxide (CO) and hydrogen). This conversion may be accomplished by subjecting the feedstock to a controlled amount of steam and oxygen at elevated pressures, e.g., from approximately 20 bar to 85 bar, and temperatures, e.g., approximately 700 degrees C. to 1600 degrees C., depending on the type of gasifier 106 utilized. Accordingly, the location 106 may have an extremely high risk level and may display, for example, a color such as red to indicate the determined risk level. However, it should be appreciated that the colors of one or more of the depicted locations 102, 104, 106, 108, 110, and 112 may transition from one color to another color as the determined risk level changes. For example, a location having a low (e.g., blue or green) risk level may change to a high (e.g., orange or red) risk level should a human (e.g., personnel 20) or mobile resource enter the particular location. Furthermore, should the sensors 26 detect the personnel 20 moving from, for example, location 112 towards another location (e.g., 102, 104, 106, 108, 110), then risk assessment system 12 may predict the associated risk and accordingly signal to, for example, an operator or security personnel to take appropriate action.

Other locations such as the locations 108 and 110 may also include relatively high risk levels and display colors such as, for example, yellow, orange, or even red to indicate the high levels of risk. For example, the locations 108 and 110 may collectively include equipment (e.g., equipment 24) such as a steam turbine engine 128, a heat recovery steam generation (HRSG) system 129, a condenser 130, a cooling tower 131, a gas turbine system 132, loads 133, a compressor 134, a combustor 135, and a turbine 136. Accordingly, the locations 108 and 110 may also be locations of high-pressures and high-temperatures, which may contribute to higher levels of risk as, for example, human resources (e.g., personnel 20) and mobile resources enter and exit areas of the locations 108 and 110. Similarly, the location 112 may include a sulfur processor 137, water treatment unit 138, and process materials 139 (e.g., Slag, Sulfur, and Salts), which may be used in the separation and processing of a number of possibly hazardous chemicals. As such, the location may be displayed as yellow, orange, or red, as the possibly hazardous chemicals may contribute to higher levels of risk as again, for example, human resources (e.g., personnel 20) and mobile resources enter and exit areas of the location 112.

Figure 3:
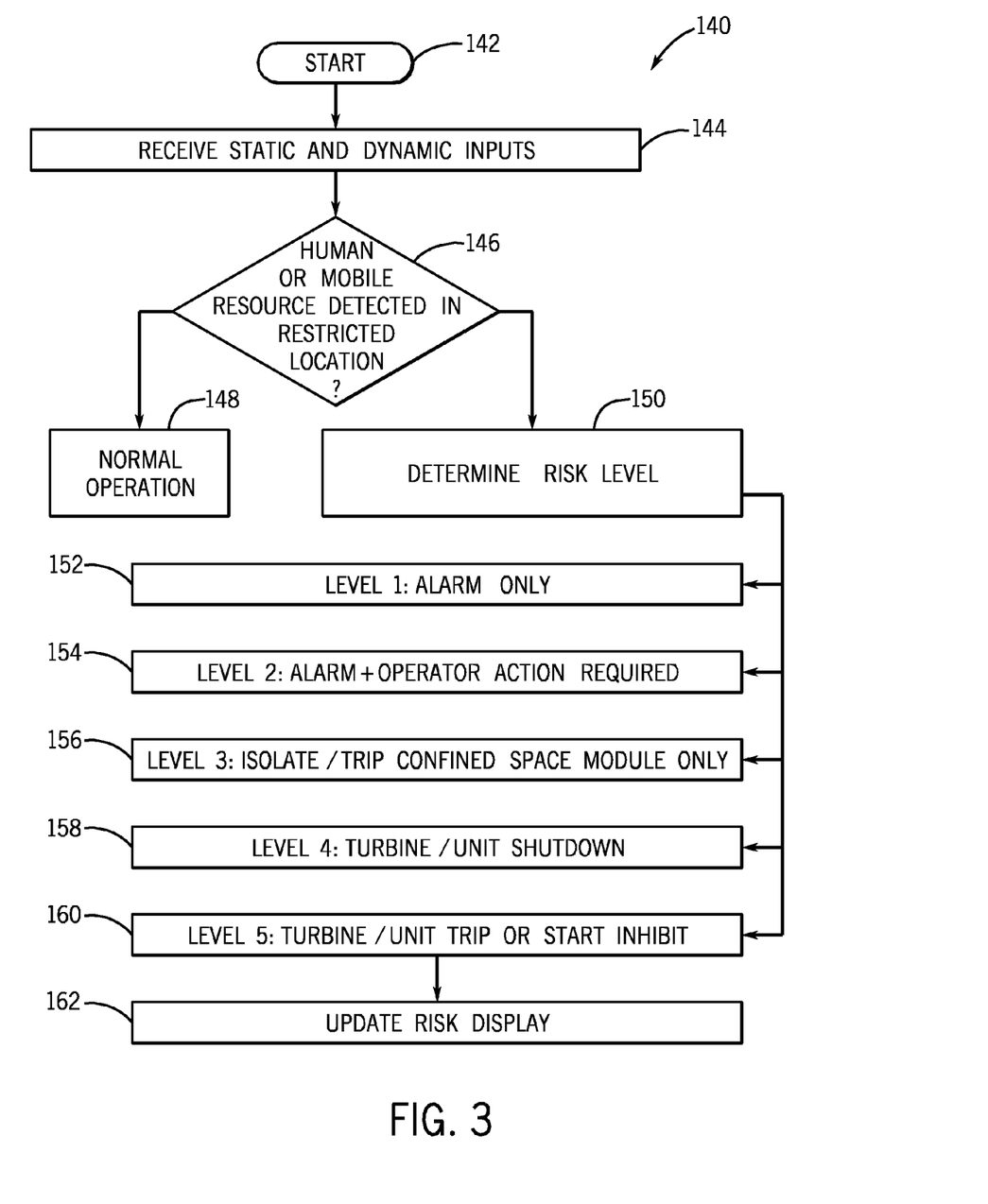
FIG. 3 is a flowchart illustrating an embodiment of a process suitable for calculating and mitigating risk in accordance with present embodiments.

Turning now to FIG. 3, a flow diagram is presented, illustrating an embodiment of a process 140 useful in calculating, managing, and mitigating risk, by detecting, for example, dynamic risk such as human and mobile resources that may contribute to risk within the industrial facility 10 depicted in FIG. 1. The process 140 may include code or instructions stored in a non-transitory machine-readable medium (e.g., a memory) and executed, for example, by one or more processors. The process 140 may begin (block 142) with the intelligent risk assessment system 12 receiving (block 144) the static inputs 28 and dynamic inputs 30. As previously discussed, the static inputs 28 may include data created during construction of the facility 10 and may be modified infrequently, while the dynamic inputs 30 may include variable and dynamic data (e.g., human resources input 55 and a mobile resources input 56) that may be generated during the day-to-day operations of the facility 10. Particularly, the human resources input 55 and the mobile resources input 56 of the dynamic inputs 30 may include location data that varies throughout the day, and may impact the risk calculation more frequently than any of the other inputs.

Accordingly, the process 140 may continue with the intelligent risk assessment system 12 determining (decision 146) whether a human or mobile resource has been detected in one or more locations (e.g., locations 102, 104, 106, 108, 110, and 112) of the facility 10, or has moved away from a location. If a human resource, such as a field technician, or a mobile resource is not detected in one or more restricted locations of the facility 10, then facility 10 may operate normally (block 148), and risk may be calculated (e.g., calculated by the risk calculation system 16) based on the static inputs 28 and dynamic inputs 30 under normal operating conditions. On the other hand, should the intelligent risk assessment system 12 detect that the presence of a human resource or a mobile resource in one or more restricted locations (e.g., locations 102, 104, 106, 108, 110, and 112), then the intelligent risk assessment system 12 may determine (block 150) a level of the risk. It should be appreciated that the intelligent system 12 may also determine a control action commensurate with the determined level of risk in an attempt to mitigate the calculated risk.

For example, as discussed with respect to FIG. 2, the intelligent risk assessment system 12 may calculate a risk model 100, in which locations 102, 104, 106, 108, 110, and 112 may represent areas and illustrate risk levels (e.g., Level 1-low, Level 2-mild, Level 3-high, Level 4-very high, Level 5-extremely high, and so forth). However, it should be appreciated that the risk levels and corresponding control actions (e.g., ALARM ONLY, ALARM+OPERATOR, ISOLATE/TRIP, UNIT SHUTDOWN, and so forth) as depicted in FIG. 2 are included merely for the purpose of example. Present embodiments may include both any number of risk levels (e.g., 6, 7, 8, 9, 10, or more risk levels and/or risk percentage and probability determinations), as well as any number of corresponding control actions. In one embodiment, the control actions may be user-configurable or otherwise automatically determined by the DSS 64 of the intelligent risk assessment system 12. The control actions may also be implemented serially, in parallel, or concurrently as the risk calculation changes due to, for example, changes in the dynamic inputs 30. Specifically, the control action may be determined by analyzing the current situational status and inputs 28 and 30 so as to derive a control action suitable for reducing and mitigating calculated and determined levels of risk.

With the aforementioned in consideration, the intelligent risk assessment system 12 may determined a risk level of 1 (block 152), which may correspond to the triggering of one or more alarms within the facility 10. For example, such a determination may be the result of a human resource or mobile resource entering one or more locations (e.g., location 102) that may be otherwise a low risk area. The alarms may include various audio tones suitable for alerting personnel (e.g., personnel 20) of the facility 10, as well as flowcharts, computer-aided design (e.g., CAD) diagrams, textual descriptions, videos, images, and so forth that may be displayed via the display and interface 60. Similarly, a determined risk level of 2 (block 154) may correspond to a control action of triggering an alarm as well as requiring operator action or attention. For example, a determined risk level of 2 may be mitigated by an operator or field technician replacing certain field devices 18, repairing the field devices 18, replacing equipment 24, overhauling equipment 24, and so forth.

In certain embodiments, determining the risk level and respective control action may also include determining a number of automated control actions that may be implemented, for example, by the plant control system 58. Accordingly, a determined risk level of 3 (block 156) may correspond to an isolation and/or tripping (e.g., temporarily deactivation) by one or more control modules (e.g., programmable logic controller [PLCs]) of equipment 24 components only within the respective location (e.g., where a human or mobile resource may be present) of the determined risk level 3. For example, if the determined risk level of 3 is associated with possible weather disruptions (e.g., precipitation, humidity, etc.), then the control action may include preparing personnel and systems for inclement weather, as well as tripping any equipment 24 in the determined high risk location that may be susceptible to overcurrent damage or other possible hazards due to the occurrence of an electrical fault.

A determined risk level of 4 (block 158) may correspond to a shutdown of entire subsystem (e.g., gas turbine system 119). For example, an auxiliary system, such as a shutdown system, may react by reducing gas turbine load, as well as limiting the power flowing to the gas turbine to shutdown one or more desired systems. The equipment 24 (e.g., gas turbine system 119) may then be brought to a condition suitable for reducing and mitigating the determined risk associated with the equipment 24. Similarly, a determined risk level of 5 (block 160) may correspond to an emergency tripping and/or shutdown of various equipment 24 (e.g., gas turbine system 132, heat recovery steam generation (HRSG) system 129, and so forth) until the risk associated with such an event is cleared and/or mitigated. In one embodiment, the process 140 may then update (block 162) the risk display 100 based on, for example, the risk level determinations (block 150). Accordingly, the risks may be presented to the user visually, in addition to the aforementioned techniques and control actions. In yet another embodiment, the determination of the risk level (block 150) may be continuously executed regardless of the determination 146, and the risk display 100 may be continuously updated (block 162). That is, the risks may be continuously determined (block 150) every millisecond, second, minute, control actions may be executed based on the determined levels 152, 154, 156, 158, and/or 160, and the risk display 100 may then be updated (block 162).

Technical effects of the disclosed embodiments relate to an intelligent risk calculation, management, and mitigation system, which may be used to calculate a risk based on static and dynamic inputs, and to determine the level of risk and one or more control actions to mitigate the risk. Specifically, the dynamic inputs may include a human resources input and a mobile resources input that may be used to calculate, manage, and mitigate risk that may be associated particularly with humans being detected in certain possibly hazardous and/or restricted locations, spaces, or areas of the industrial facility.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a processor configured to execute a risk assessment system of a gas turbine system, comprising:
   a risk calculation system executed by the processor and configured to calculate a risk based on one or more static inputs and one or more dynamic inputs, wherein the risk calculation system is configured receive the one or more static inputs and the one or more dynamic inputs from a sensor as an indication of a location of a human resource, a location of a mobile resource, or a combination thereof, and wherein the risk calculation system is configured to update the risk based on signals received from the sensor and based on a current measurement of an operating condition of the gas turbine system; and
   a decision support system (DSS) executed by the processor and configured to use the risk to derive one or more decisions based on the risk, the one or more static inputs, and the one or more dynamic inputs, wherein the one or more decisions are configured to aid in operating an industrial facility comprising the gas turbine system.

2. The system of claim 1, wherein the risk calculation system comprises a statistical model, a physics-based model, a heuristic model, or a combination thereof.

3. The system of claim 1, wherein the risk calculation system comprises an accident scenario review (ASR) model configured to derive the probability of an undesired work stoppage event, an accident, or a combination thereof.

4. The system of claim 1, wherein the risk calculation system is configured to calculate the risk comprising multiple layers of concurrent contributing risk factors.

5. The system of claim 1, wherein the one or more static inputs comprises a design data, a manufacturing data, a plant configuration, a failure mode analysis, a regulation, a margin for unknown factors, or a combination thereof.

6. The system of claim 1, wherein the one or more dynamic inputs comprises a plant instrumentation input, a plant equipment input, a plant external independent systems data, a business environment input, an external systems input, a replacement of unknown factors input, a human resources input, a mobile resources input, or a combination thereof.

7. The system of claim 1, wherein the location of the human resource, the location of the mobile resource, or the combination thereof, comprises a confined space, a possibly hazardous area, a restricted area, or a combination thereof, within the industrial facility.

8. The system of claim 1, wherein the DSS is configured to derive the one or more decisions via determining a level of the risk.

9. The system of claim 1, comprising a controller configured to use the one or more decisions to execute a control action configured to control at least one component of the industrial facility.

10. The system of claim 9, wherein the control action corresponds to at least one determined risk level.

11. The system of claim 9, wherein the control action comprises an alarm, an operator intervention, an isolation of the at least one component, a shutdown of the at least one component, or a combination thereof.

12. The system of claim 1, wherein the DSS is configured to use an event rule, a mitigation action algorithm, a recommended action algorithm, a risk calculation algorithm, a failure prediction algorithm, a model updating algorithm, an action scheduling algorithm, or a combination thereof, to derive the one or more decisions.

13. A method, comprising:
   receiving one or more static inputs and one or more dynamic inputs from a plurality of sensors, wherein the plurality of sensors are configured to provide an indication of a location of a human resource, a location of a mobile resource, or a combination thereof, as the one or more dynamic inputs;
   calculating a risk based on the one or more static inputs and one or more dynamic inputs, wherein the one or more static inputs and the one or more dynamic inputs are based on an industrial facility comprising a turbine system;
   updating the risk based on signals from the plurality of sensors and based on a current measurement of an operating condition of the turbine system; and
   deriving a decision based on the calculation of the risk, wherein the decision comprises a determined level of the risk and is configured to aid in operations of the industrial facility.

14. The method of claim 13, wherein calculating the risk based on the one or more dynamic inputs comprises calculating a probability of the location of the human resource, the location of the mobile resource, or the combination thereof.

15. The method of claim 13, wherein receiving the one or more dynamic inputs comprises detecting the location of the human resource, the location of the mobile resource, or the combination thereof, via a plurality of sensors disposed in a confined space, a possibly hazardous area, a restricted area, or a combination thereof, in the industrial facility.

16. The method of claim 13, comprising:
   determining a first control action if the determined level of the risk is of a first level, wherein determining the first control action comprises selecting a first mitigation action; and
   determining a second control action if the determined level of the risk is of a second level, wherein determining the second control action comprises selecting a second mitigation action.

17. The method of claim 13, comprising executing via a controller a control action for controlling at least one component of the industrial facility based on the decision.

18. A control system comprising:
   a processor configured to execute a risk assessment system for a gas turbine system comprising:
      a risk calculation system executed by the processor and configured to calculate a risk based on one or more static inputs and one or more dynamic inputs received via a plurality of sensors, wherein the plurality of sensors are configured to provide an indication of a location of a human resource, a location of a mobile resource, or a combination thereof, as the one or more dynamic inputs, and wherein the location of the human resource, the location of the mobile resource, of the combination thereof, comprises an area inside of an industrial facility comprising the gas turbine system, and wherein the risk calculation system is configured to update the risk based on signals received from the plurality of sensors and based on a current measurement of an operating condition of the gas turbine system;
      a decision support system (DSS) executed by the processor and configured to use the risk to provide a decision based on the risk; and
   a controller configured to use the decision to execute a control action configured to control at least one component of the industrial facility.

19. The system of claim 18, wherein the gas turbine system is configured to provide electrical power, mechanical power, or a combination thereof.

20. The system of claim 18, wherein the location of the human resource, the location of the mobile resource, or the combination thereof, comprises a confined space, a possibly hazardous area, a restricted area, or a combination thereof, nearby or inside a gas turbine system, a gasifier, a gas treatment system, a steam generator, an air compressor, or a combination thereof.

21. The system of claim 1, wherein the risk calculation system is configured to update the risk continuously during operations of the industrial facility based on the signals received from the sensor.

* * * * *